United States Patent [19]

Sullivan et al.

[11] Patent Number: 5,273,576
[45] Date of Patent: Dec. 28, 1993

[54] INTENSELY COLORED PEARLESCENT PIGMENTS

[75] Inventors: William J. Sullivan, Ossining; Thomas J. Birch, Cold Spring, both of N.Y.

[73] Assignee: Mearl Corporation, Ossining, N.Y.

[21] Appl. No.: 962,839

[22] Filed: Oct. 19, 1992

[51] Int. Cl.$^5$ ............................................. C04B 14/20
[52] U.S. Cl. ............................... 106/418; 106/DIG. 3
[58] Field of Search .................... 106/418, DIG. 3

[56] References Cited

U.S. PATENT DOCUMENTS

| | | | |
|---|---|---|---|
| 3,087,828 | 4/1963 | Linton | 106/418 |
| 3,087,829 | 4/1963 | Linton | 106/418 |
| 3,711,308 | 1/1973 | Brand et al. | 106/418 |
| 3,869,298 | 4/1975 | Suzuki et al. | 106/418 |
| 3,926,659 | 12/1975 | Bernhard et al. | 106/418 |
| 4,128,435 | 12/1978 | Bäumer et al. | 106/418 |
| 4,146,403 | 3/1979 | Armanini et al. | 106/418 |
| 4,289,746 | 9/1981 | Hayakawa et al. | 106/418 |
| 4,780,140 | 10/1988 | Franz et al. | 106/418 |
| 4,828,623 | 5/1989 | Nitta et al. | 106/417 |
| 5,091,011 | 2/1992 | DeLuca, Jr. | 106/418 |

FOREIGN PATENT DOCUMENTS 3235017 3/1984 Fed. Rep. of Germany ...... 106/418

Primary Examiner—Helene Klemanski
Attorney, Agent, or Firm—Ostrolenk, Faber, Gerb & Soffen

[57] ABSTRACT

Iron oxide-coated micaceous pigments having a chroma enhancing amount of a coating of a colorless metal oxide which has a refractive index of at least about 2.0 exhibit intensely colored effects.

18 Claims, No Drawings

INTENSELY COLORED PEARLESCENT PIGMENTS

BACKGROUND OF THE INVENTION

Many pearlescent or nacreous pigments are based on micaceous or other lamellar substrates which have been coated with a metal oxide layer. As a result of reflection and refraction of light, these pigments exhibit pearl-like luster and depending on the thickness of the metal oxide layer, they can also exhibit interference color effects. A good description of this type of pigment can be found in U.S. Pat. Nos. 3,087,828 and 3,087,829.

The pearlescent pigments encountered most often on a commercial basis are titanium dioxide coated mica and iron oxide coated mica pearlescent pigments. Both types are well known in the art. It is also well known that the metal oxide layer may frequently be overcoated.

In U.S. Pat. No. 3,087,828, there is a description of depositing an $Fe_2O_3$ layer onto a $TiO_2$ layer. In U.S. Pat. No. 3,711,308, a pigment is described in which there is a mixed layer of titanium and iron oxides on the mica and that is overcoated with titanium dioxide and/or zirconium dioxide. U.S. Pat. No. 3,874,890 describes pigments coated with $TiO_2$ or $ZrO_2$ being overcoated with iron (II) hydroxide which is thereafter oxidized to $Fe_2O_3$. U.S. Pat. No. 4,146,403 describes an iron oxide-coated mica pigment with a very thin layer of $TiO_2$ or $Al_2O_3$ and U.S. Pat. No. 4,086,100 describes rutile $TiO_2$-coated mica with an additional top layer composed of coloring metal oxides including, inter alia, $Fe_2O_3$.

It has now been discovered that when an iron oxide-coated mica pigment is overcoated with a colorless metal oxide having a refractive index of at least about 2.0, an intense coloring effect is achieved when the coating amount falls within certain ranges. If the metal oxide has a lower refractive index or if it has the correct refractive index but is present in an incorrect amount or if the layers are inverted, the intense coloring effect is not realized.

It is accordingly the object of this invention to provide new intensely colored pearlescent pigments. This and other objects of the invention will become apparent to those skilled in this art from the following detailed description.

SUMMARY OF THE INVENTION

This invention relates to intensely colored pearlescent pigments and more particularly to intensely colored iron oxide-coated micaceous pearlescent pigments which have thereon a chroma enhancing amount of a coating of a colorless metal oxide having a refractive index of at least about 2.0.

DETAILED DESCRIPTION OF THE INVENTION

In accordance with the present invention, intensely colored pearlescent pigments are obtained by coating an iron oxide coated-mica pearlescent pigment with a chroma enhancing amount of a colorless metal oxide having a refractive index of at least about 2.0. The iron oxide coated-mica pearlescent pigments are well known in the art. They are generally formed by depositing a hydrous iron compound on a mica substrate followed by hydrolysis and calcining to produce the iron oxide-coated mica pigment. Any of the iron oxide-coated mica pigments known heretofore can be used in the present invention.

Pursuant to the invention, the iron oxide-coated mica pigment is coated with a colorless metal oxide which has a refractive index of at least about 2.0. The colorless metal oxide can thus be tin oxide which has a refractive index of 2.0, zinc oxide which also has a refractive index of 2.0, zirconium dioxide which has a refractive index of 2.1, titanium dioxide which has a refractive index of 2.5, or the like. Most preferably the colorless metal oxide is titanium dioxide. The general procedure for depositing the colorless metal oxide is convention and accordingly the iron oxide-coated mica pigment substrate can be dispersed in an aqueous medium to which a metal salt solution is added at a constant pH. When the proper amount has been deposited, the coated product is thereafter isolated, washed, dried and calcined. The calcining, however, must be done at temperatures of less than about 800° C. because higher calcining temperatures increase the possibility that there will be formation of pseudobrookite ($Fe_2TiO_5$), an entity which reduces the intensity and unique color value of these pigments. As an example, an aqueous dispersion containing about 20% by weight of iron oxide-coated mica pigment, heated to 50°–900° C., can have a titanyl chloride solution added at a constant PH, generally between about 1.5 and 3.0. The pH is maintained at a constant value during the titania addition by simultaneously adding base. The addition is continued until the desired color is obtained whereupon the coated product is isolated by filtration, washed, dried and calcined at a temperature of up to 800° C.

The intense color of the instant pigments is realized when a chroma enhancing amount of the colorless metal oxide is present. This amount varies depending on the particular iron oxide-coated mica pigment which is coated and the particular colorless oxide being employed. For example, an intense orange pigment was obtained by adding 17 to 23% $TiO_2$ to a bronze colored iron oxide-coated mica pigment while it required 13–17% $TiO_2$ when used in conjunction with a copper colored iron oxide-coated mica pigment and 20–24% $TiO_2$ when applied to a russet colored iron oxide-coated mica pigment. In general terms, the amount of colorless metal oxide is usually within the range of 10 to 25 weight % based on the total weight of the pigment. X-ray diffraction analyses has indicated that these products are a combination of hematite, $TiO_2$ in the anatase crystalline form and mica, and did not reveal any evidence of pseudobrookite.

As used in this specification and claims, a chroma enhancing amount means an amount of colorless metal oxide which increases the chroma value relative to the value for the uncoated iron oxide-coated mica pigment by at least 1%, preferably at least about 5% and most preferably at least about 10%.

The products of the present invention can be used in any application where the iron oxide-coated mica pigments have been used heretofore. For example, and without limitation, the intensely colored iron oxide-coated mica pigments can be used in various cosmetic formulations, printing inks, as colorants for plastic resins and in automotive paints.

EXAMPLES

The examples which follow describe representative embodiments of the invention. The appearance of the products in these examples are described visually. In addition, instrumental measurements were made in order to characterize the color and color intensity of each of the products. CIELab data are provided with each example in order to describe the change in appearance which resulted from changing the initial substrate to the final product. This data was obtained by incorporating the powders in a nitrocellulose lacquer, creating a drawdown in the conventional manner and then making the appropriate measurements.

The color characteristics of the products in these examples were evaluated by measuring the L*a*b* data against a white background using a spectrophotometer. See "The Measurement of Appearance", Second Edition, Edited by Hunter and Harold (John Wiley & Sons 1987). These CIELab measurements characterize the appearance of a product in terms of its lightness-darkness component, symbolized by L*, a red-green component represented by a* and a yellow-blue component symbolized by b*. Two additional parameters can be derived from the L*a*b* data; the chroma (C*) i.e. $[(a^*)^2+(b^*)^2]^{\frac{1}{2}}$ and the hue (h*) i.e. arctan (b*/a*). Chroma refers to the intensity or vividness of the color and the hue to the color shade of the product. The C* or chroma value is of particular significance as it demonstrates the increase in color intensity.

EXAMPLE 1

One hundred grams of an iron oxide-coated mica containing 37% $Fe_2O_3$, having a median particle size of 17 μm and a bronze appearance were dispersed in 500 ml of water. After heating this dispersion to 50° C., 210 ml of a 39% solution of stannic chloride were added over 150 minutes at pH 1.6. The pH was maintained at 1.6 during the tin addition by simultaneously adding a dilute solution of sodium hydroxide. The resulting product was subsequently isolated, washed, dried and calcined at 650° C. to yield an intensely colored pigment having a coating containing about 40% $SnO_2$ and 21% $Fe_2O_3$ on the mica.

The CIELab data which follows describes the colors for both the initial iron oxide-coated mica pigment and the $SnO_2$-coated iron oxide-coated mica pigment.

|  | L* | a* | b* | C* | h* |
| --- | --- | --- | --- | --- | --- |
| Initial | 41 | 26 | 32 | 41 | 50 |
| $SnO_2$-Coated | 56 | 26 | 33 | 42 | 52 |

This data indicates that the $SnO_2$-coated iron oxide-coated mica pigment has a lighter, slightly yellower and slightly more intense color than the starting bronze colored iron oxide-coated mica pigment.

EXAMPLE 2

One hundred grams of the same iron oxide-coated mica used in Example 1 were dispersed in 500 ml of water. After heating to 65° C., a 40% $TiCl_4$ solution was added at a rate of 1.2 ml/min. The pH was maintained at 2.6 during the addition by simultaneously adding a dilute solution of sodium hydroxide. The titania addition was stopped after 120 ml of solution were added. The resulting product was filtered, washed, dried and calcined at 700° C. to yield an intensely colored orange pigment consisting of 21% $TiO_2$, 29% $Fe_2O_3$ and 50% mica.

This product was drawn down and its appearance characterized by making CIELab measurements. The initial bronze substrate and the intensely colored titanium dioxide-coated iron oxide-coated mica pigment colors are described using the following CIELab data:

|  | L* | a* | b* | C* | h* |
| --- | --- | --- | --- | --- | --- |
| Initial | 41 | 26 | 32 | 41 | 50 |
| $TiO_2$-Coated | 47 | 29 | 39 | 49 | 53 |

The CIELab color data demonstrates that this product has both a yellower and redder color and a much higher color intensity. The C* data also indicates that a greater increase in color intensity is obtained by adding $TiO_2$ than with $SnO_2$ (C*=49 when $TiO_2$ was added vs C*=42 when $SnO_2$ was used in Example I).

When only 45 ml of titania were added, the resulting product consisted of 8% $TiO_2$, 35% $Fe_2O_3$ and 57% mica. The CIELab data for this product is:

| L* | a* | b* | C* | h* |
| --- | --- | --- | --- | --- |
| 41 | 27 | 33 | 42 | 51 |

While this product has a very slightly more orange appearance and very slightly higher color intensity than the starting material, it is not nearly as intense a color as the finished product.

EXAMPLE 3

The purpose of this example is to show that reversing the titanium and iron layers does not yield the same intense color, but a very dull, low luster color.

One hundred grams of a titanium dioxide-coated mica having a median particle size of about 17 μm and containing about 26% $TiO_2$ were dispersed in 500 ml of water and then heated to 75° C. 200 ml of a 39% $FeCl_3$ solution were added over 175 minutes. The pH was maintained at 3.5 during the iron addition by simultaneously adding dilute NAOH. The resulting product was then isolated, washed, dried and calcined at 700° C. to yield a dull, reddish brown powder consisting of 21% $TiO_2$ and 29% $Fe_2O_3$. Even though this product has a similar composition to the material in Example 2, visually this reversed layer product had a much duller, uninteresting appearance.

The CIELab data for this reversed layer product (i.e. a $Fe_2O_3$-coated $TiO_2$-coated mica pigment) along with the data from the product prepared in the previous example (i.e. $TiO_2$ coated onto an iron oxide-coated mica pigment) are:

|  | L* | a* | b* | C* | h* |
| --- | --- | --- | --- | --- | --- |
| $Fe_2O_3$-Coated $TiO_2$-Coated | 54 | 23 | 20 | 31 | 42 |
| $TiO_2$-Coated $Fe_2O_3$-Coated | 47 | 29 | 39 | 49 | 53 |

It can be seen from this data that even though these two products have the same chemical composition, their appearances are totally different. Not only are they different colors, but the reversed layer product (i.e. the $Fe_2O_3$ coated on $TiO_2$) is not nearly as intense in color as the $TiO_2$ coated on $Fe_2O_3$.

EXAMPLE 4

An aqueous dispersion containing 100 grams of a copper colored iron oxide-coated mica containing about 45% $Fe_2O_3$ and having a median particle size of about 17 μm was heated to 65° C. Approximately 120 ml of a 40% TiCl4 solution were added to the dispersion at a rate of about 1.2 ml/min. The pH was maintained at 2.6 during the titania addition by simultaneously adding a dilute sodium hydroxide solution. The resulting product was subsequently isolated by filtering, washing, drying and calcining at 700° C. The resulting product had an intense red-orange color and consisted of 14% TiO2, 37% Fe2O3 and 49% mica.

The initial copper colored iron oxide-coated mica pigment and the TiO2- coated iron oxide-coated mica pigment colors are characterized with the following CIELab data:

|  | L* | a* | b* | C* | h* |
|---|---|---|---|---|---|
| Initial | 41 | 29 | 30 | 42 | 46 |
| TiO2-Coated | 49 | 39 | 34 | 47 | 46 |

This CIELab data indicates that adding an appropriate amount of the TiO2 to the copper colored iron oxide-coated mica pigment results in a lighter, more intense color.

EXAMPLE 5

One hundred grams of a reddish colored iron oxide-coated mica consisting of about 48% Fe2O3 and having a median particle size of about 17 μm were dispersed in 500 ml of water and heated to 75° C. Added to this dispersion at pH 2.4 were 133 ml of a 40% TiCl4 solution at a rate of 0.8 ml/min. Dilute NAOH was used to maintain the pH at 2.4 during the titania addition. The coated product was then filtered, washed, dried and calcined to yield a reddish-brown pigment consisting of 23% TiO2 and 36% Fe2O3.

Spectral measurements to characterize the appearance of this product were made on a drawdown of the pigment. The CIELab data for the colors are as follows:

|  | L* | a* | b* | C* | h* |
|---|---|---|---|---|---|
| Initial | 41 | 33 | 32 | 46 | 44 |
| TiO2-Coated | 49 | 37 | 37 | 52 | 45 |

This data confirms the visual observations and indicates the color intensity has increased.

EXAMPLE 6

One hundred grams of a copper colored iron oxide-coated mica pigment containing 54% Fe2O3 and having a median particle size of 11 μm were dispersed in 500 ml of water. After heating to 60° C., 130 ml of a 40% TiCl4 solution were added at a rate of 1.2 ml/min. The pH was maintained at 2.8 by simultaneously adding a dilute solution of sodium hydroxide. The resulting product was isolated, washed, dried and calcined at 700° C. to yield an intensely colored red-orange pigment containing 22% TiO2, 41% Fe2O3 and 37% mica. When drawn down, this product had an intense red-orange appearance. The colors for these two products are described using the following CIELab data:

|  | L* | a* | b* | C* | h* |
|---|---|---|---|---|---|
| Initial | 37 | 31 | 34 | 46 | 48 |
| TiO2-Coated | 44 | 34 | 38 | 51 | 48 |

These results again verify the visual observations that the color has become lighter and more intense.

Various changes and modifications can be made in the products and process of this invention without departing from the spirit and scope thereof. The various embodiments which have been disclosed herein were for the purpose of further illustrating the invention but were not intended to limit it.

What is claimed is:

1. An iron oxide coated micaceous pearlescent pigment having thereon a chroma enhancing amount of a coating of a colorless metal oxide having a refractive index of at least about 2.0 thereon, said chroma enhancing amount being that which increases the chroma value relative to the value for the uncoated iron-oxide coated pigment by at least 1%.

2. The pigment of claim 1 in which the colorless metal oxide is selected from the group consisting of tin oxide, zinc oxide and zirconium dioxide.

3. The pigment of claim 1 wherein the colorless metal oxide is titanium dioxide.

4. The pigment of claim 3 in which the chroma enhancing amount is in the range of 13 to 25 weight % based on the weight of the pigment.

5. A method of making the pigment of claim 1 which comprises hydrolyzing a metal salt in the presence of an iron oxide-coated micaceous pearlescent pigment so as to form a colorless metal oxide of refractive index of at least about 2.0 on the pigment, terminating the hydrolysis when a chroma enhancing amount of the coating has been achieved and calcining the resulting coated pigment at a temperature below about 800° C., said chroma enhancing amount being that which increases the chroma value relative to the value for the uncoated iron-oxide coated pigment by at least 1%.

6. The method of claim 5 in which the colorless metal oxide is selected from the group consisting of tin oxide, zinc oxide and zirconium dioxide.

7. The method of claim 5 wherein the colorless metal oxide is titanium dioxide.

8. The method of claim 7 in which the chroma enhancing amount is in the range of 13 to 25 weight % based on the weight of the pigment.

9. In a composition colored by the incorporation of an effective pigmentary amount of a pearlescent pigment therein, the improvement which comprises said pigment being the pigment of claim 1.

10. In a composition colored by the incorporation of an effective pigmentary amount of a pearlescent pigment therein, the improvement which comprises said pigment being the pigment of claim 2.

11. In a composition colored by the incorporation of an effective pigmentary amount of a pearlescent pigment therein, the improvement which comprises said pigment being the pigment of claim 3.

12. In a composition colored by the incorporation of an effective pigmentary amount of a pearlescent pigment therein, the improvement which comprises said pigment being the pigment of claim 4.

13. The pigment of claim 1 in which the chroma enhancing amount is that which increases the chroma value relative to the value for the uncoated iron oxide-coated pigment by at least 5%.

14. The pigment of claim 1 in which the chroma enhancing amount is that which increases the chroma value relative to the value for the uncoated iron oxide-coated pigment by at least 10%.

15. The pigment of claim 14 wherein the colorless oxide is titanium dioxide and the chroma enhancing amount is in the range of about 13 to 25 weight % based on the weight of the pigment.

16. The method of claim 5 in which the chroma enhancing amount is that which increases the chroma value relative to the value for the uncoated iron oxide-coated pigment by at least 5%.

17. The method of claim 5 in which the chroma enhancing amount is that which increases the chroma value relative to the value for the uncoated iron oxide-coated pigment by at least 10%.

18. The method of claim 17 wherein the colorless oxide is titanium dioxide and the chroma enhancing amount is in the range of 13 to 25 weight % based on the weight of the pigment.

* * * * *